US008095084B2

(12) United States Patent
Rune

(10) Patent No.: US 8,095,084 B2
(45) Date of Patent: Jan. 10, 2012

(54) NON-REAL-TIME SELECTION OF DISTRIBUTED DHO NODES

(75) Inventor: Johan Rune, Lidingö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 721 days.

(21) Appl. No.: 12/279,612

(22) PCT Filed: Feb. 17, 2006

(86) PCT No.: PCT/EP2006/060065
§ 371 (c)(1),
(2), (4) Date: Aug. 15, 2008

(87) PCT Pub. No.: WO2007/093219
PCT Pub. Date: Aug. 23, 2007

(65) Prior Publication Data
US 2009/0069014 A1    Mar. 12, 2009

(51) Int. Cl.
*H03C 7/02* (2006.01)
*H04W 36/00* (2009.01)
(52) U.S. Cl. .......... 455/101; 455/436; 455/442
(58) Field of Classification Search ............. 455/101, 455/436, 91, 550.1, 442, 444, 403
See application file for complete search history.

(56) References Cited

U.S. PATENT DOCUMENTS

| | | | | |
|---|---|---|---|---|
| 5,594,943 A * | 1/1997 | Balachandran | | 455/436 |
| 5,754,956 A * | 5/1998 | Abreu et al. | | 455/434 |
| 6,757,536 B1 * | 6/2004 | Kim et al. | | 455/436 |
| 6,845,238 B1 * | 1/2005 | Muller | | 455/436 |
| 6,876,866 B1 * | 4/2005 | Ulupinar et al. | | 455/522 |
| 2003/0083070 A1 * | 5/2003 | Ishikawa et al. | | 455/436 |
| 2004/0185851 A1 * | 9/2004 | Nagai | | 455/436 |
| 2005/0009555 A1 * | 1/2005 | Iwanaga et al. | | 455/525 |
| 2005/0070289 A1 * | 3/2005 | Vestama et al. | | 455/442 |
| 2005/0097161 A1 * | 5/2005 | Chiou et al. | | 709/200 |
| 2005/0272425 A1 * | 12/2005 | Amerga et al. | | 455/436 |

FOREIGN PATENT DOCUMENTS
EP    1521494 A2    4/2005

* cited by examiner

*Primary Examiner* — Temesgh Ghebretinsae
*Assistant Examiner* — Devan Sandiford

(57) ABSTRACT

The present invention relates to an arrangement adapted to be located in a network node, e.g. in a RNC, in a mobile communication network. The arrangement selects at least one diversity handover, DHO, node, that is to perform macro diversity functions, amongst the nodes of the mobile communication network comprising macro diversity functionality means. The selection is based on base station combinations of said mobile communication network. The arrangement comprises means for retrieving at least one DHO node, that is to perform macro diversity functions, from a database comprising base station combinations of said mobile communication network and a pre-calculated DHO node selection for each such base station combination. The present invention also relates to said database. The database comprises means for storing base station combinations of said mobile communication network and means for storing a pre-calculated Diversity Handover node selection for each such base station combination.

33 Claims, 6 Drawing Sheets

NON-REAL-TIME SELECTION OF DISTRIBUTED DHO NODES

FIELD OF THE INVENTION

The present invention relates to arrangements in a cellular mobile communication network comprising means for handling macro diversity functions, and in particular to arrangements for determining a node that is to perform the macro diversity functions.

BACKGROUND OF THE INVENTION

Third generation (3G) mobile communication systems (e.g. Universal Mobile Telecommunications System (UMTS)) shall offer high quality voice and data services for mobile users. The systems shall also provide high capacity and universal coverage. In some situations that may however be difficult to fulfil, due to unreliable radio channels. One promising technique to combat link reliability problems over the radio interface is macro diversity techniques. Macro diversity should however also be seen as an inherent consequence of using Code Division Multiple Access (CDMA) as the multiple access technique in a cellular network. CDMA is an interference limited technology. That is, it is the interference in a cell that sets the upper limit for the cell's capacity. To keep the interference as low as possible it is essential that the base station controls the output power of the radio transmitters of the mobile terminals in the cell, i.e. fast and efficient power control is essential. As a mobile terminal moves towards the periphery of a cell it has to increase the power of its radio transmission in order for the base station to be able to receive the transmitted signal. Likewise, the base station has to increase the power of its radio transmission towards the mobile terminal. This power increase has a deteriorating effect on the capacity of both the mobile terminal's own cell and the neighboring cell(s) which the mobile terminal is close to. Macro diversity is used to mitigate this effect. When the mobile terminal communicates via more than one base station, the quality of the communication can be maintained with a lower radio transmission power than when only a single base station is used. Thus, macro diversity is both a feature raising the quality of unreliable radio channels and a necessity that is required in order to overcome an inherent weakness of CDMA based cellular systems.

The present invention relates to arrangements in a radio access network of a cellular mobile network comprising means for handling macro diversity functions. An example of such a radio access network is the UMTS terrestrial radio access network (UTRAN). The UTRAN is illustrated in FIG. 1 and comprises at least one Radio Network System (RNS) 100 connected to the Core Network (CN) 200. The CN is connectable to other networks such as the Internet, other mobile networks e.g. GSM systems and fixed telephony networks. The RNS 100 comprises at least one Radio Network Controller (RNC) 110. Furthermore, the respective RNC 110 controls a plurality of Node-Bs 120, 130 that are connected to the RNC by means of the Iub interface 140. Each Node B covers one or more cells and is arranged to serve the User Equipment (UE) 300 within said cell(s). Finally, the UE 300, also referred to as mobile terminal, is connected to one or more Node Bs over the Wideband Code Division Multiple Access (WCDMA) based radio interface 150. The network of FIG. 1 is also referred to as a WCDMA network and is based on the WCDMA standard specified by the 3:rd Generation Partnership Project (3GPP).

Macro diversity implies in this description that the mobile terminal communicates with more than one base station simultaneously, i.e. the same data flow is transmitted to/from the mobile terminal from/to at least two different base station. When two or more base stations receive/transmit the same data flow, the data flows are combined/split at a higher node, referred to as a diversity handover node (DHO node). The DHO node may be a RNC, or a Node B (or another type of node such as a specialized DHO node or a new type of control node) when a distributed macro diversity scheme is used as explained below.

In current UTRANs macro diversity is realized through macro diversity functionality (i.e. DHO functionality) in the RNCs. The standard allows DHO functionality in both the serving RNC (SRNC) and the drift RNC (DRNC), but many vendors have chosen not to use the possibility to locate DHO functionality in the DRNC. The standard also allows up to six macro diversity legs, i.e. six Node Bs in the active set, but products may be limited to be implemented such that only two and three leg macro diversity is possible, i.e. maximum three Node Bs in the active set. The reason for limiting the active set to three Node Bs is that very little gain is expected from additional legs.

Thus, in existing macro diversity solutions the user data is transported in multiple separate data flows, one for each macro diversity leg, all the way between the RNC and the Node Bs. This consumes costly transmission resources in the UTRAN transport network. A more transmission efficient way to realize the macro diversity in a UTRAN is to distribute the DHO functionality to the Node Bs (and the RNCs). The result is not only distributed macro diversity functionality but also hierarchical macro diversity functionality, since more than two macro diversity legs may result in more than one DHO node. The benefits that can be achieved depend on the topology of the UTRAN transport network. FIGS. 2 and 3 illustrate two cases when the distributed DHO functionality is beneficial compared to having the DHO functionality only in the RNC. It should be noted that the DHO functionality could also be distributed to other types of nodes than Node Bs (base stations) and RNCs, e.g. specialized DHO nodes or new types of control nodes. Having noted this, the further description of the present invention will, for the sake of clarity, focus on RNCs and Node Bs (base stations) as DHO nodes, but the present invention is applicable also when other types of DHO nodes are used.

Mechanisms for such a distributed macro diversity scheme have been described in WO2005/62654, WO2005162655 and WO2005/62495. The scheme, which is controlled by the SRNC, includes:
mechanisms for selection of the Node Bs that are to perform the macro diversity functions (splitting and combining), i.e. the distributed DHO nodes;
mechanisms for directing the data flows between the selected DHO nodes and providing the DHO nodes with the information that they need in order to perform the splitting and combining; and
a timing scheme to handle the trade off between delay and data loss.

The present invention deals with the first of the above three items, i.e. selection of DHO nodes, i.e. to select which of the DHO enabled nodes that is to perform the macro diversity function. A number of real-time DHO node selection schemes are described in WO2005/62654 and WO2005/62655. The major parts of the invention can be used also together with other DHO node selection schemes than the ones described in WO2005/62654 and WO2005/62655. Common for the DHO node selection schemes is that they rely on topology information from the transport network layer to select the most appropriate DHO nodes. An RNC can retrieve the necessary topology information in four different ways:
1. Through manual or semi-automatic management operations.
2. Via a link state routing protocol.
3. Using a traceroute mechanism that allows the RNC to discover the hop-by-hop route to each Node B in an IP UTRAN.
4. Through signaling an RNC may possibly retrieve topology information from other RNCs to cater for the inter-RNS case (if applicable).

The traceroute method may be the most attractive one, but it only works in IP based UTRANs.

The retrieved topology information is stored in a topology database in the RNC which is updated when/if the topology of the UTRAN changes. The information in the topology database includes (at least):
   The hop-by-hop route from the RNC to each Node B in the RNS and possibly to some Node Bs in neighboring RNSs to cater for inter-RNS soft handover cases.
   A delay metric for each hop in a route.
   Some sort of generic cost metric for each hop in a route. The generic cost metric reflects the operator's relative willingness to use the link for data transport. In the simplest case the delay metric is used as the generic cost metric.
   Information about which nodes that are DHO enabled, i.e. the Node Bs comprising macro diversity function. However, this information does not have to be included in the topology database as such. It may alternatively be stored elsewhere in the RNC.

The goal of a DHO node selection algorithm is to select DHO nodes in a way that minimizes the accumulated generic cost metrics for the all the macro diversity legs put together with the condition that for none of the resulting data paths is the resulting path delay allowed to exceed a maximum delay value defined for the UTRAN.

The above mentioned real-time DHO node selection algorithms use the information in the topology database to create a "route tree" that is the basis for the DHO node selection for a certain macro diversity configuration i.e. for a certain combination of Node Bs for a macro diversity connection. Then a set of preliminary DHO nodes are selected and together with the SRNC, any involved non-DHO node Node Bs and the relative interconnections of the nodes they form a conceptual "DHO node tree".

Then the RNC checks that the resulting path delay will not exceed the maximum allowed path for any of the macro diversity legs. If a path delay is too large, DHO nodes are removed until the path delay is acceptable for all macro diversity legs. Alternatively the delay checks may be integrated in the selection of the preliminary DHO nodes.

The real-time DHO node selection is executed when needed, i.e. when the macro diversity configuration of a connection is established or changed (i.e. when a Node B/base station is added or removed from the combination of Node Bs/base stations used for a macro diversity connection).

Although the above-mentioned existing DHO node selection schemes work, they do have certain disadvantages. They are all calculation-intensive procedures that are to be executed under a real-time pressure. Therefore, the existing DHO node selection schemes may adversely affect the real-time properties of connection establishment i.e. introduce increased delay and may therefore delay changes in the macro diversity configuration of a connection i.e. additions or removals of Node Bs taking part in the macro diversity connection.

Another aspect of this problem is that the introduced increased delay limits the complexity that can be allowed for a real-time DHO node selection scheme and thus limits the potential accuracy that the scheme can achieve, i.e. how close its DHO node choices are to the theoretically ideal choices.

The problems with the introduced increased delay may be addressed by adding more computation resources in the RNC, but that would instead unnecessarily increase the cost of the node.

SUMMARY OF THE INVENTION

As stated above, it is desired to achieve a solution that provides a real time DHO node selection scheme that does not introduce delay.

Therefore, the object of the present invention is to achieve an arrangement that avoids delay during the real time DHO node selection.

The object of the present invention is achieved by the arrangements according to the independent claims.

Preferred embodiments are defined by the dependent claims.

The arrangement according to the present invention is adapted to be located in a network node, e.g. in an RNC, in a mobile communication network such as a WCDMA network or an evolved version thereof for selecting at least one diversity handover, DHO, node, that is to perform macro diversity functions, amongst the nodes of the mobile communication network comprising macro diversity functionality means. The selection is based on base station combinations of said mobile communication network and the arrangement comprises means for retrieving at least one DHO node, that is to perform macro diversity functions, from a database comprising base station combinations of said mobile communication network and a pre-calculated DHO node selection for each such base station combination.

The database according to the present invention is adapted to be located in a network node in a mobile communication network, and comprises means for storing base station combinations of said mobile communication network and means for storing a pre-calculated Diversity Handover node selection for each such base station combination.

The nodes comprising macro diversity functionality means are preferably base stations and nodes controlling base stations.

According to a preferred embodiment, the arrangement comprises means for limiting the number of base station combinations in the database based on the usefulness of the base station combinations, e.g. based on neighbor relations of the base stations within the base station combination or based on previous actual use of the base station combination.

According to one embodiment the arrangement comprises means for updating the base station combinations to be included in the database. The updating may be triggered by a configuration change of the mobile communication network and performed continuously as a background process. Furthermore, the updating may be based on new base station neighbor relations. In addition, the arrangement comprises means for removing base station combinations from the database by time stamping each used base station combination such that the last time the combination was used is indicated.

According to a further embodiment, the arrangement comprises means for updating the pre-calculated DHO node selections for the base station combinations stored in the database. Means may also be provided for performing continuous updating of the pre-calculated DHO node selections for the base station combinations in the database as a background process. The updating may also be triggered by a configuration change of the mobile communication network.

According to further embodiments, the arrangement comprises means for temporarily allocating more computation resources to the updating when the configuration of the mobile communication network changes and means for interrupting updating of the pre-calculated DHO node selection of a base station combination in the database if it is determined that the updating will not change the DHO node selection of the base station combination. Moreover, means for storing a tree of routes formed by the route from the network node to each of the base stations in the base station combination and means for comparing the stored tree of routes with a new tree of routes derived from information from an updated topology database may also be provided. The tree of routes may be stored by means of a signature or digest. The means for interrupting may comprise further means for updating of the pre-calculated DHO node selection for a base station combination in the database, if said new tree of routes is different from said stored tree of routes and/or further means for updating of the pre-calculated DHO node selection for a base station combination in the database, if said new tree of routes is different from said stored tree of routes. A timestamp associated with the route from the network node to each base station may be stored by the arrangement, wherein the timestamp indicates the last time when the route was updated, e.g. the last time the DHO node selection for the base station combination was calculated.

According to a further embodiment, means are provided for triggering updating of the DHO node selection for a base station combination in the database by a configuration change of the mobile communication network if it is determined that the updating will change the DHO node selection for the base station combination. Moreover, means may also be provided for temporarily allocating more computation resources to the updating if it is determined that the updating will change the DHO node selection of the base station combination in the database.

According to a further embodiment, the arrangement comprises means for storing a timestamp that indicates the time of the last relevant event in the mobile communication network, wherein the last relevant event is a type of events that may affect the DHO node selection of base station combinations in the database. Means for storing a timestamp associated with each base station combination in the database may be provided, wherein the timestamp indicates the last time the DHO node selection for the base station combination was calculated. The DHO node selection of a base station combination in the database may be avoided, unless the timestamp associated with the base station combination indicates a later time than said timestamp that indicates the time of the last relevant event in the mobile communication network.

According to a further embodiment, the arrangement comprises means for time stamping a base station wherein the timestamp indicates when the last event occurred that may affect the DHO node selection of base station combinations that include said base station in the database.

According to a yet further embodiment means for temporarily disabling macro diversity functionality means after events that affect the content of the database of base station combinations are provided.

An advantage with the present invention is that it relieves the calculation-intensive DHO node selection process from the real-time pressure.

A further advantage is that it replaces the real-time DHO node selection calculations with a database lookup, thereby eliminating the increased setup delay (and soft handover delay) for macro diversity connections that would otherwise be introduced by a distributed macro diversity scheme. Also, it allows more advanced and computation-demanding DHO node selection algorithms to be used, due to the relaxed real-time requirements.

A further advantage is that through various optimizations according to the present invention, the required resources, in terms of memory and computation power, for creation, maintenance and usage of the DHO node selection database, can be limited to rather insignificant numbers.

DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to macro diversity in a cellular network. Most of the mechanisms of the present invention are not limited to a 3GPP UTRAN, but could also be used in other networks employing macro diversity. Therefore the solution is described using the more general term "base station" rather than the UTRAN specific term "Node B". In a UTRAN context the terms "base station" and "Node B" are regarded as equivalent. However, the UTRAN specific terms "RNC" and "RNS" are kept in lack of well-established equivalent general terms.

Figure 1:
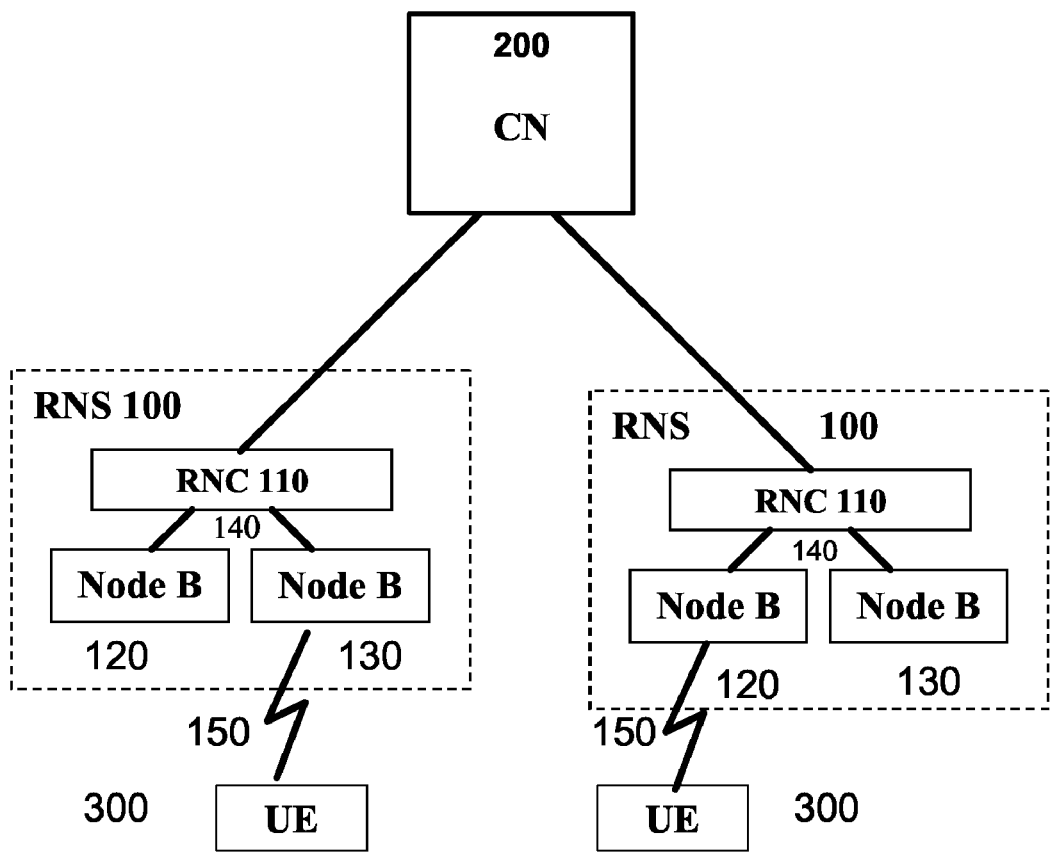
FIG. 1 illustrates an example of an existing mobile cellular network.
Figure 2:
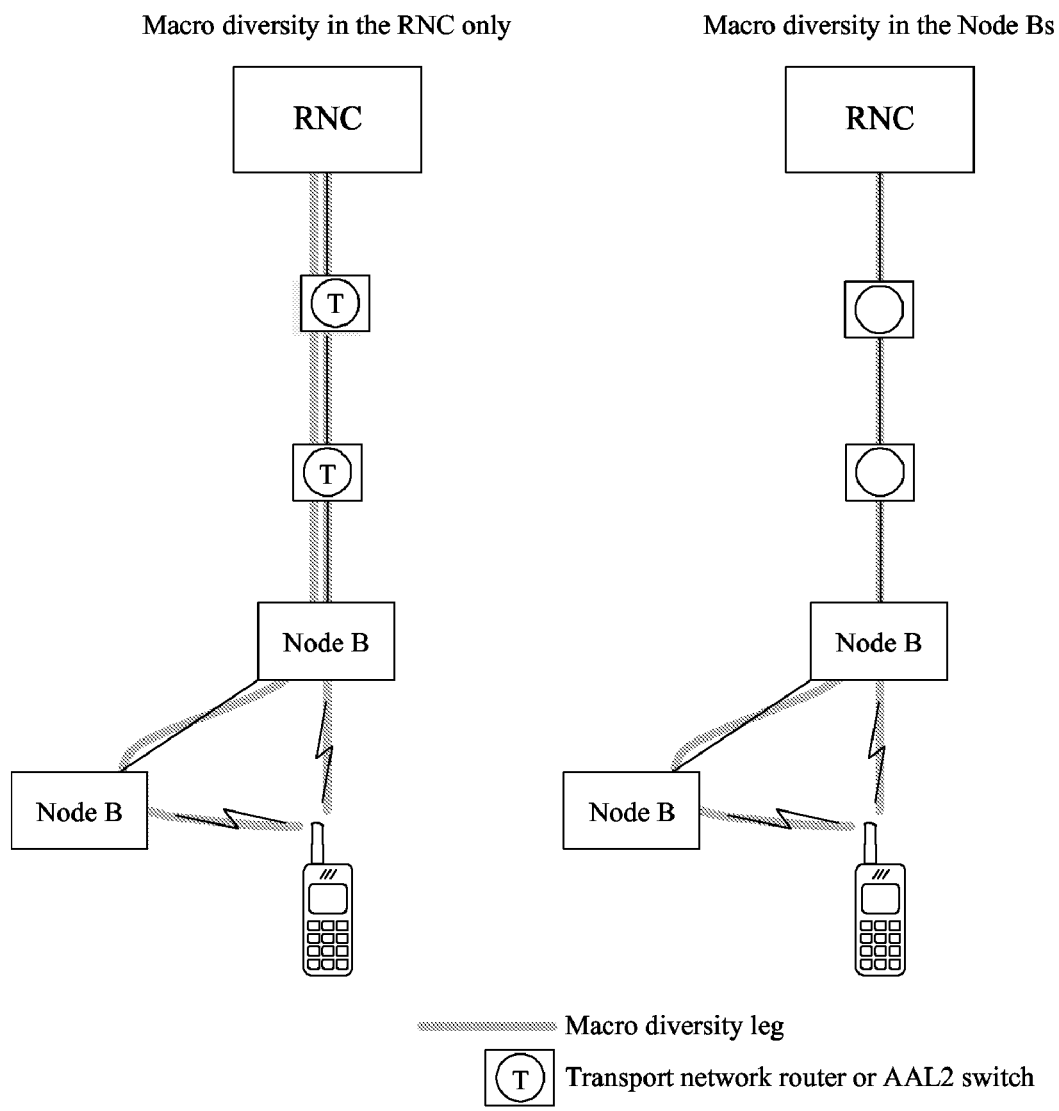
FIG. 2 illustrates the potential transmission savings in an example with cascaded Node Bs.
Figure 3:
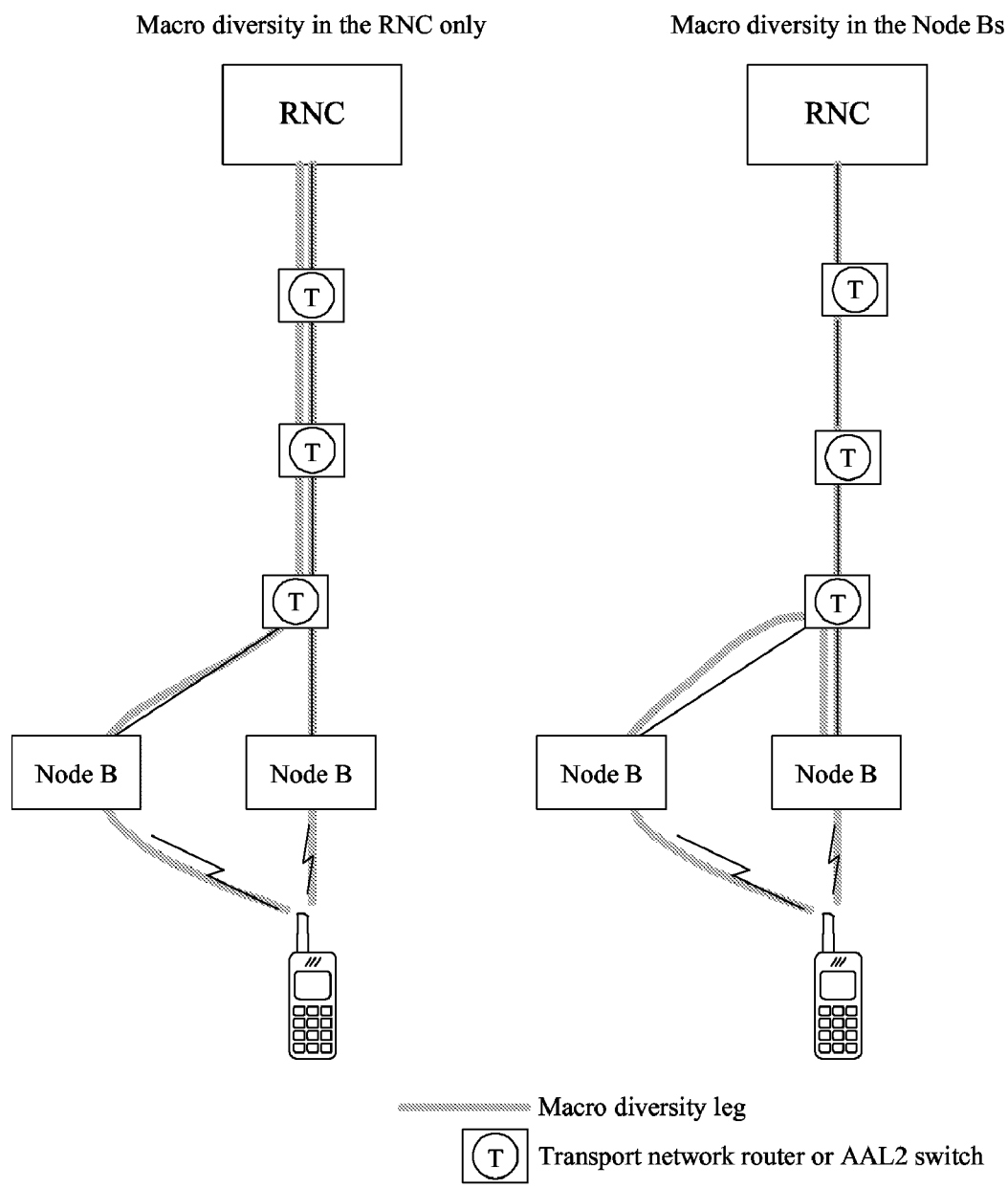
FIG. 3 illustrates the potential transmission savings in an example with a transport network with a tree topology.
Figure 4:
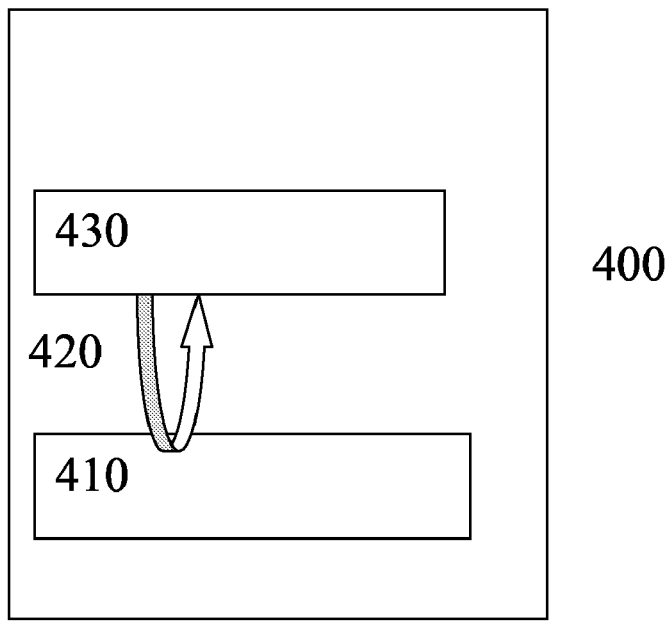
FIG. 4 illustrates the arrangement according to the present invention.

Instead of performing the DHO node selection calculations in real-time on demand, the DHO node selection for each macro diversity configuration i.e. each combination of base stations is calculated in advanced and stored in a database together with the base station combination according to the present invention. The database is preferably located in an RNC. It should be noted that the present invention is not limited to the situation when the database is located in the RNC, even if that is the case in the examples in the following description. Hence a database is formed that contains all or a subset of macro diversity configurations in the RNS of said RNC and their respective pre-calculated DHO node selection. That implies that each entry of the database contains a base station combination and the associated DHO node tree produced by a DHO node selection algorithm. Thus an arrangement is provided by the present invention that makes it possible to retrieve the DHO node(s), i.e. the DHO enabled base station(s) (and/or other types of node(s)), that is(are) to perform macro diversity functions, from the database comprising base station combinations and a pre-calculated DHO node selection for each such base station combination. Such an arrangement is illustrated in FIG. 4. The arrangement 400 comprises the above described database 410 and means 420 for retrieving the DHO node(s) that is(are) to perform macro diversity functions from the database to a DHO node selection unit 430. The arrangement is located in a network node, preferably a node adapted to control radio base stations such as a RNC. Further, the present invention also relates to a database adapted to be located in the network node. The database comprises means for storing base station combinations and means for storing a pre-calculated DHO node selection for each such base station combination. Each RNC is responsible for its own database, which contains only base station combinations that belong to the RNC itself i.e. only intra-RNS macro diversity cases are considered. The DHO node selections may be calculated using the same algorithms as in the existing solutions.

The nodes in the database are represented in the same way as in the topology database and as described for the DHO node selection algorithms in WO2005/62654, e.g. by using IP addresses.

Subsequently, when a DHO node selection (in the form of a DHO node tree) is needed, because of a macro diversity connection setup or a macro diversity configuration change, the RNC simply retrieves the DHO node from the database according to the present invention, using the concerned base station combination as the key.

Configuring the database may be a huge task, due to the potentially very large number of base station combinations. Manual configuration is not a reasonable alternative. Creation and maintenance of the database must be automated. Thus, the RNC itself, or alternatively an O&M tool, may preferably generate the base station combinations to be included in the database, add or remove combinations as needed.

Consequently it is not enough to calculate the DHO node selection database only once. On the contrary it has to be continuously updated in order to reflect the changes in base station deployment and transport network topology. Therefore, the RNC continuously refreshes the database, recalculates each DHO node selection result, adds entries with new base station combinations containing newly deployed base stations and removes entries with base station combinations containing removed base stations.

Recalculation of the DHO node selection results should preferably be performed as a low-priority background task (or by other means separated from computations with higher priority), so as to not interfere with high-priority real-time tasks like Radio Resource Control (RRC) signaling, connection handling and traffic execution.

It would also be possible to run DHO node selection recalculations only during periods of low load, e.g. during nighttime.

When a new base station is added, the RNC calculates the resulting new base station combinations to be included in the database. As each such new base station combination is added to the database, the RNC also calculates its associated DHO node selection result and includes it in the same database entry. This process should not be allowed to interfere with high-priority tasks, but may be given higher priority than the continuous recalculation of DHO node selection results.

When a base station is removed, the RNC may immediately identify and remove all the entries in the database containing base station combinations that include the removed base station. It is however not necessary to do this immediately. Instead the RNC may integrate this process in the continuous recalculation of the database entry. In such case the RNC would check the validity of each base station combination before recalculating its associated DHO node selection result. If a database entry contains a base station combination that includes a removed base station, the RNC removes the entry (instead of recalculating its DHO node selection result) and moves on to recalculate the next database entry.

Due to the required updates described above, optimizations are required in order to reduce the number of entries in the database. Therefore, embodiments of the present invention also include optimizations including mechanisms for limiting the number of base station combinations in the database based on the usefulness of the base station combinations. The radio network comprises many base stations which results in a great number of theoretically possible combinations of the base stations. However only a few of these theoretically possible combinations will in reality be used. Therefore, the base station combinations that are included in the database are those that will be useful. Embodiments 1 and 2 are examples how the usefulness may be determined. The purposes of the optimizations are hence to reduce the memory needed for the database and to reduce the convergence times after topology changes (and other changes affecting the DHO node selection calculations) for the most frequently used base station combinations. In general the optimizations reduce the processing and memory requirements of the invention.

Examples how the number of possible base station combinations, i.e. entries in the database, increases with increasing number of base stations is showed below. Even when limiting the number of base stations in a base station combination (i.e. in the active set) to three, the number of possible base station combinations in a RNS grows drastically with growing number of base stations. For example, the applicant's largest RNC configuration comprises currently 540 base stations, but to be future proof the non-real-time DHO node selection scheme should preferably anticipate and be able to cope with even larger configurations.

The following notation is used in the mathematical expression of the possible number of base station combinations below:

n The number of base stations in the RNS.
$N_2$ The number of possible combinations of two base stations.
$N_3$ The number of possible combinations of three base stations.
$N_T$ The total number of possible combinations of base stations.

$$N_2 = \binom{n}{2} = \frac{n(n-1)}{2!} = \frac{n^2 - n}{2} \quad \{\text{Eq. 1}\}$$

$$N_3 = \binom{n}{3} = \frac{n(n-1)(n-2)}{3!} = \frac{n^3 - 3n^2 + 2n}{6}$$

$$N_T = N_2 + N_3 = \frac{n^3 - n}{6} \Rightarrow N_T = k \times n^3 + O(n)$$

Table 1 illustrates samples of the above mathematical expressions.

TABLE 1

The number of possible combinations of two ($N_2$), three ($N_3$) and two or three ($N_T$) base stations as a function of the number of base stations (n) in the RNS.

| n | $N_2$ | $N_3$ | $N_T$ |
|---|---|---|---|
| 10 | 45 | 120 | 165 |
| 25 | 300 | 2300 | 2600 |
| 50 | 1225 | 19600 | 20825 |
| 100 | 4950 | 161700 | 166650 |
| 250 | 31125 | 2573000 | 2604125 |
| 500 | 124750 | 20708500 | 20833250 |
| 1000 | 499500 | $1.66167 \times 10^8$ | $1.666665 \times 10^8$ |
| 1500 | 1124250 | $5.613755 \times 10^8$ | $5.6249975 \times 10^8$ |
| 2000 | 1999000 | $1.331334 \times 10^9$ | $1.333333 \times 10^9$ |

Figure 5:
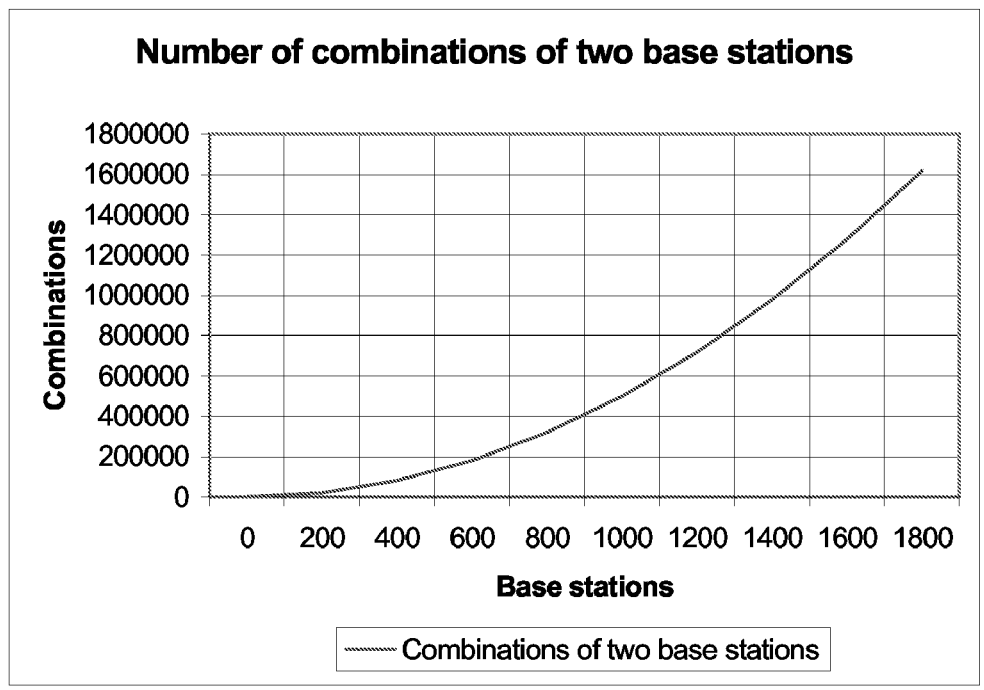
FIG. 5 illustrates the number of possible combinations of two base stations as a function of the total number of base stations in the RNS.
Figure 6:
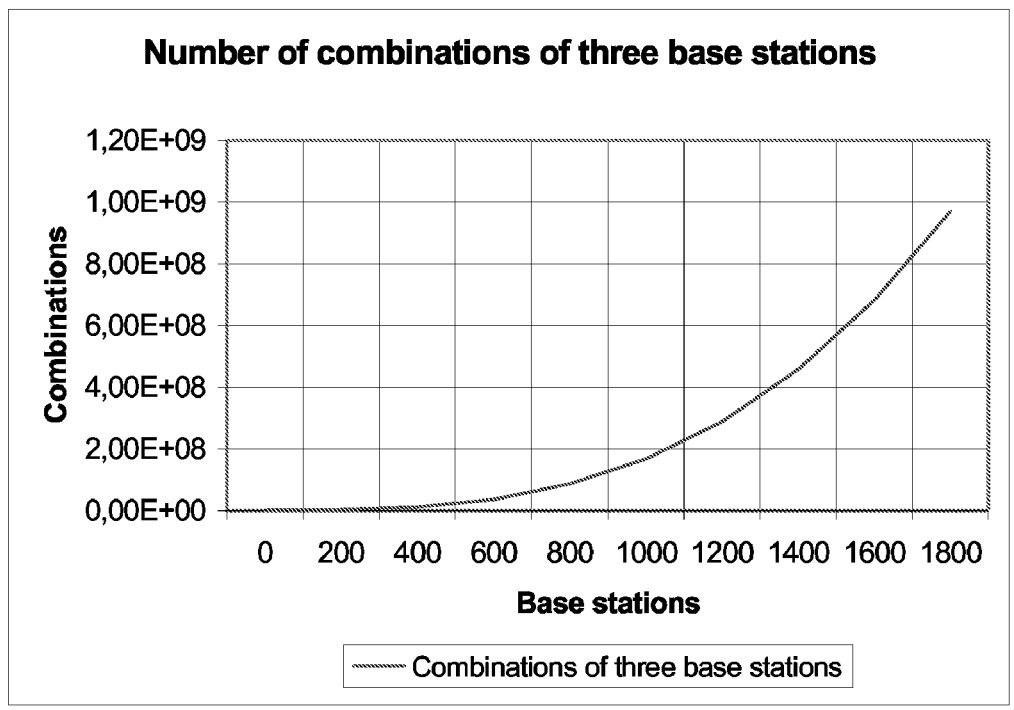
FIG. 6 illustrates the number of possible combinations of three base stations as a function of the total number of base stations in the RNS.

FIG. 5 is a diagram showing the number of possible combinations of two base stations ($N_2$) as a function of the number of base stations (n) in the RNS and FIG. 6 illustrates the number of possible combinations of three base stations ($N_3$) as a function of the number of base stations (n) in the RNS. Consequently, the DHO node selection database may become very large, requiring undesirably large amounts of memory. In addition, the larger database, the longer time is required to update all the entries (see Table 2), which in turn may result in that the convergence time after changes (topology changes etc.), i.e. the time until the DHO node selection results in the database reflect the new situation, becomes unacceptably long.

TABLE 2

Database recalculation times, using plain, unoptimized, cyclic recalculation, for different numbers of base stations in the RNS and three different recalculation rates. Apparently the recalculation times become quite unreasonable already for a couple of hundred base stations.

| Number of base stations, n | Number of database entries, $N_T$ | Database recalculation times for different recalculation rates | | |
|---|---|---|---|---|
| | | Recalculation rate: 1 entry/second | Recalculation rate: 3 entries/second | Recalculation rate: 10 entries/second |
| 10 | 165 | 165 seconds | 55 seconds | 16.5 seconds |
| 25 | 2600 | 43.3 minutes | 14.4 minutes | 4.3 minutes |
| 50 | 20825 | 5 hours, 47 min | 1 hour, 56 min | 34.7 minutes |
| 100 | 166650 | 46 hours, 18 min | 15 hours, 26 min | 4 hours, 38 min |
| 250 | 2604125 | 30 days | 10 days | 3 days |
| 500 | 20833250 | 8 months | 80 days | 24 days |
| 1000 | $1.666665 \times 10^8$ | 5.3 years | 1 year, 9 months | 6.3 months |
| 1500 | $5.6249975 \times 10^8$ | 17.8 years | 5.9 years | 1 year, 9 months |
| 2000 | $1.333333 \times 10^9$ | 42.3 years | 14.1 years | 4.2 years |

However, the vast majority of the base station combinations that can be formed are completely unrealistic, due to large geographic separation of the base stations, and will in practice never be used. This effect is greater the more base stations that are connected to the RNC, because the number of possible base station combinations increases drastically when the number of base stations increase (see Table 1), whereas the number of realistic base station combinations increase at a much lower rate. Thus it is desired to exclude unrealistic and irrelevant base station combinations from the database.

In the mathematical expressions used in the estimation of the number of realistic base station combinations, the following notation is used, in addition to the definitions above:

C The number of base stations with which a certain (typical average) base station can form two-leg macro diversity configurations.

$M_2$ The number of realistic two-leg macro diversity configurations (i.e. combinations of two base stations) that include a certain base station.

$M_3$ The number of realistic three-leg macro diversity configurations (i.e. combinations of three base stations) that include a certain base station.

$N_{R\text{-}tot}$ The total number of realistic base station combinations (i.e. macro diversity configurations) in a RNS.

α A parameter related to the overlap of two neighboring base stations' respective group of neighbors.

δ A parameter related to the effects of RNS borders on the number of intra-RNS base station neighbor relations.

λ A summarizing parameter, $$\lambda = \frac{M_2}{2} + \frac{M_3}{3}.$$

To estimate the number of realistic base station combinations in a RNS a simplified model with homogeneously distributed uniform base stations with negligible impacts from neighboring RNSs is considered. In this model, disregarding RNS border effects, a certain base station, denoted BTS A, can only take part in two-leg macro diversity configurations (i.e. macro diversity configurations including two base stations) together with a fixed number, C, of other base stations that are geographically close enough. These geographically close base stations are denoted A-neighbors. Thus, the number of possible two-leg macro diversity configurations, $M_2$, for a certain base station can be expressed as $M_2 = C$ The value of C depends on the density of the base stations, their transmission power, usage of umbrella cells, algorithms and operator policies used for radio network planning and cell neighbor list configuration, etc. In this context the geographical closeness is formalized into the cell neighbor list that is configured for each cell and stored in the RNC. A condition for adding a new cell to an active set, i.e. a soft handover configuration, is that one of the cells that are already a part of the active set has a formal neighbor relation to the new cell, i.e. that the new cell is included in the cell neighbor list of at least one of the cells in the active set. This is further described below.

For three-leg macro diversity configurations the situation is more complicated. The number of three-leg macro diversity configurations, $M_3$, a certain base station, BTS A, can take part in (again disregarding RNS border effects) can be expressed as $$M_3 = \alpha_1 \frac{C^2 - C}{2} + \alpha_2 C^2 = \left(\frac{\alpha_1}{2} + \alpha_2\right)C^2 - \frac{\alpha_1}{2}C$$

In this expression the first term, $\alpha_1(C^2-C)/2$, represents the three-leg macro diversity configurations that in addition to BTS A itself include only A-neighbors (i.e. base stations from the group of base stations that are geographically close enough to the certain base station to form two-leg macro diversity configurations with it). The second term, $\alpha_2 C^2$, represents the three-leg macro diversity configurations that include one base station that is not an A-neighbor (i.e. base station combinations consisting of BTS A, one A-neighbor and one non-A-neighbor).

Setting $\alpha_1=1$ makes the first term in the expression for $M_3$ equal to $(C^2-C)/2$, which is the number of possible base station combinations including BTS A and two A-neighbors. However, some of these base station combinations are not realistic, because a terminal will not be able to communicate with all three base stations simultaneously, due to the geographic separation of the base stations. For instance, a combination of BTS A, the most distant A-neighbor in one direction and the most distant A-neighbor in the opposite direction is unrealistic, because a terminal would not be able to communicate with the two A-neighbors simultaneously. To capture this effect $\alpha_1$ should have a value in the range $0<\alpha_1<1$. It is difficult to estimate the value of $\alpha_1$, but a rough, but probably quite reasonable, estimation yields $$\alpha_1 \approx \tfrac{3}{4}.$$

The parameter $\alpha_2$ has a similar purpose in the second term in the expression for $M_3$. But in the case of $\alpha_2$ the purpose is to capture both the effect of limited communication range (as in the case of $\alpha_1$ in the first term) and the fact that only a fraction of an A-neighbor's neighbors (neighbor in this context defined as a base station with which a two-leg macro diversity configuration can be formed) consists of non-A-neighbors. A rough estimation of a reasonable average value of $\alpha_2$ for the whole group of C A-neighbors yields $$\alpha_2 \approx \tfrac{1}{4}.$$

Using these values of $\alpha_1$ and $\alpha_2$ in the above expression for $M_3$ results in the following new expression for $M_3$:

$$M_3 \approx \frac{5}{8}C^2 - \frac{3}{8}C = \frac{5C^2 - 3C}{8}$$

The total number of possible macro diversity configurations, $M_T$, for a certain base station can hence be expressed as $$M_T = M_2 + M_3$$
$$= C + \left(\frac{\alpha_1}{2} + \alpha_2\right)C^2 - \frac{\alpha_1}{2}C$$
$$\approx C + \frac{5}{8}C^2 - \frac{3}{8}C$$
$$= \frac{5}{8}(C^2 + C)$$

The values of C, $\alpha_1$ and $\alpha_2$ are not very important. The point is that $M_T$ is a constant that is independent of the number of base stations, n, in the RNS.

The total number of realistic base station combinations in a RNS, $N_{R-tot}$, is, however, of course not independent of n. $N_{R-tot}$ can be expressed as $$N_{R-tot} = n\left(\frac{M_2}{2} + \frac{M_3}{3}\right) - \delta\sqrt{n} \quad \{\text{Eq. 2}\}$$

where $\delta < \sqrt{n}\left(\frac{M_2}{2} + \frac{M_3}{3}\right)$.

$\Rightarrow N_{R-tot} = \lambda \times n + O(n^{1/2})$ where $\lambda = \frac{M_2}{2} + \frac{M_3}{3}$ is a constant.

$\Rightarrow N_{R-tot} = k \times n + O(n^{1/2})$ $M_2$ is divided by 2 and $M_3$ is divided by 3 in order to account for the fact that otherwise the number of combinations of two base stations would be counted twice and the number of combinations of three base stations would be counted thrice. $\delta\sqrt{n}$, where $\delta$ is a constant, represents the RNS border effects, reflecting the fact that base stations close to the border of the RNS have fewer intra-RNS neighbor base stations and hence fewer possible intra-RNS macro diversity configurations than other base stations. A rough estimation of $\delta$ for a large RNS yields the following expression:

$$\delta \approx 0.36 \times \left(\frac{M_2}{2} + \frac{M_3}{3}\right)\sqrt{C\pi}$$
$$\approx \left\{\alpha_1 \approx \frac{3}{4}, \alpha_2 \approx \frac{1}{4} \Rightarrow \frac{M_2}{2} + \frac{M_3}{3} \approx \frac{5C^2 + 9C}{24}\right\} \approx$$
$$\approx \frac{0.36 \times \sqrt{\pi}}{24}\left(5C^{\frac{5}{2}} + 9C^{\frac{3}{2}}\right)$$
$$= 0.015 \times \sqrt{\pi}\left(5C^{\frac{5}{2}} + 9C^{\frac{3}{2}}\right)$$

The above expression for $\delta$ is based on the assumption that the RNS border effects are, as the term implies, limited to an area at the borders of the RNS, while a major part of the RNS is still more or less unaffected. This assumption is not true for small RNSs, e.g. n<100. Therefore the expression for $\delta$, and thus the expression for $N_{R-tot}$, does not produce good results when n<100.

As can be seen from {Eq. 1} and {Eq. 2} the number of possible base station combinations, $N_T$, in a large RNS (i.e. with a large n) is approximately proportional to $n^3$, whereas the number of realistic base station combinations, $N_{R-tot}$, is approximately proportional to n (where n is the number of base stations in the RNS). This reflects the fact that each base station can only be part of base station combinations including neighbor base stations that are located reasonably close to it. In practice the fraction of the possible base station combinations that will ever be used is actually very small. For large RNC configurations it may even be less than 0.1%. This clearly indicates the potential for reduction of the size of the database.

Figure 7:
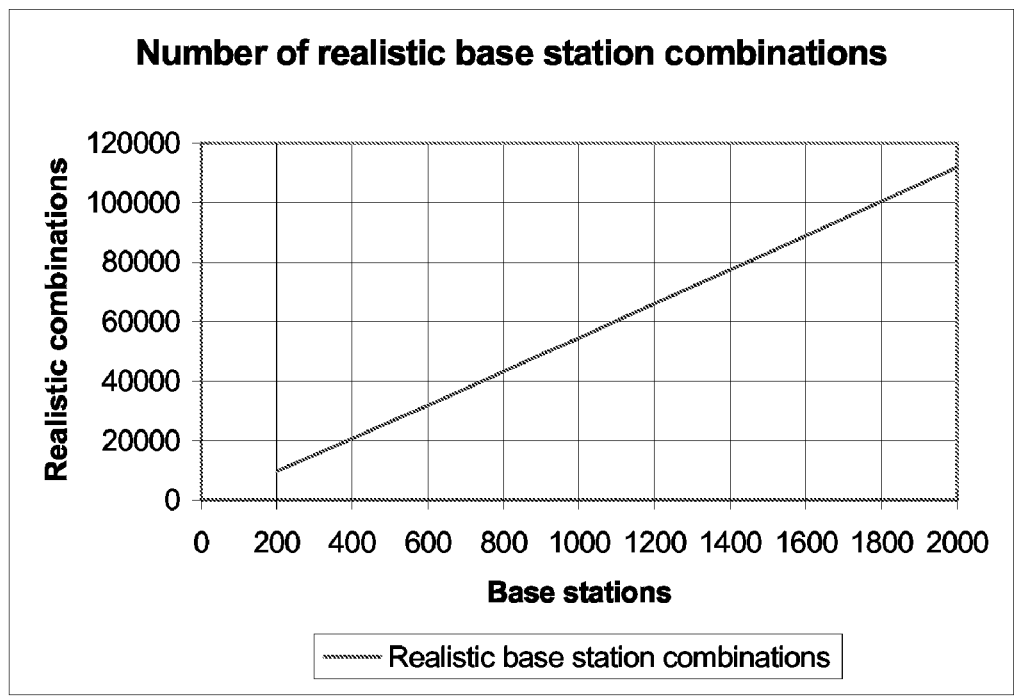
FIG. 7 illustrates the number of realistic combinations of two or three base stations as a function of the total number of base stations in the RNS.
Figure 8:
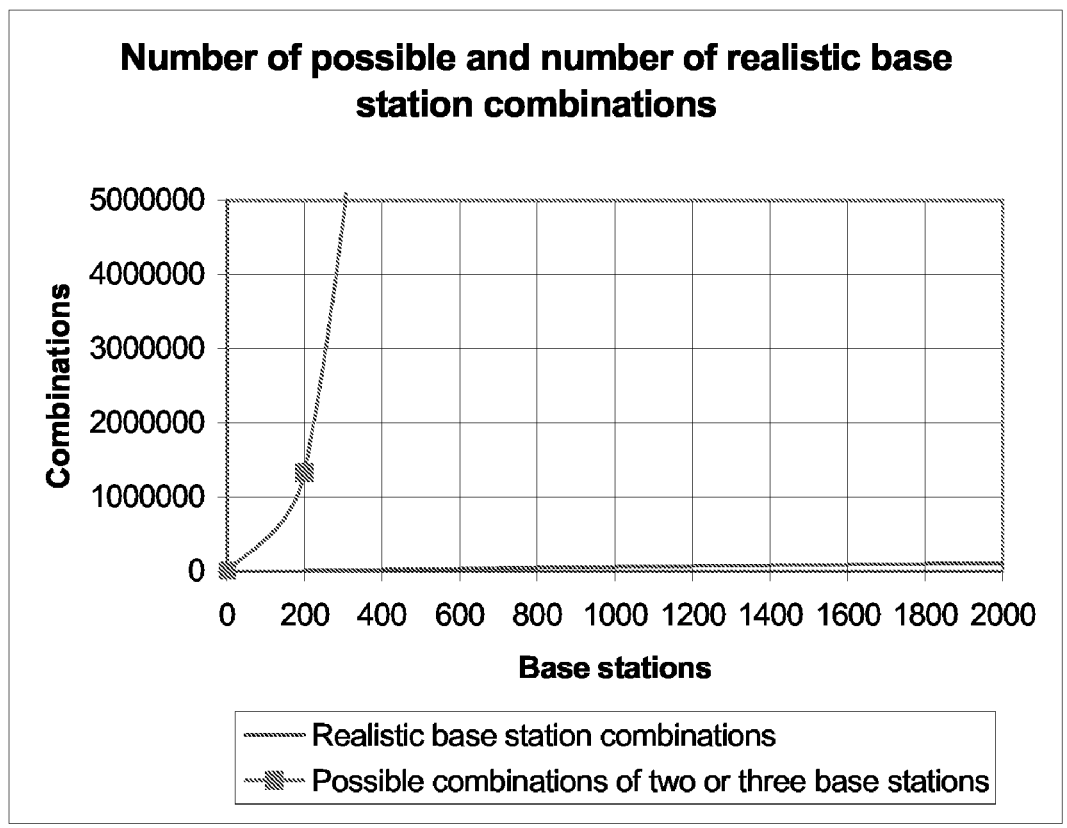
FIG. 8 illustrates the number of possible and the number of realistic combinations of two or three base stations as a function of the total number of base stations in the RNS.

Table 3 and FIGS. 7 and 8 provide an example to illustrate the difference between the number of realistic base station combinations and the number of possible base station combinations. In this example the value of C has been set to C=16, which yields $M_2=16$, $M_3 \approx 154$ and $\delta \approx 151.44$.

TABLE 3

The difference between the number of realistic base station combinations and the number of possible base station combinations as a function of the number of base stations in the RNS is illustrated. The value of C is set to C = 16. Due to the poor accuracy in the $N_{R-tot}$ estimation calculations for small values of n, the smallest n value is chosen to n = 100.

| n | $N_{R-tot}$ | $N_T$ | $N_{R-tot}/N_T$ |
|---|---|---|---|
| 100 | 4419 | 166650 | 0.026516 |
| 250 | 12439 | 2604125 | 0.004777 |
| 500 | 26280 | 20833250 | 0.001261 |
| 1000 | 54544 | $1.666665 \times 10^8$ | $3.27 \times 10^{-4}$ |
| 1500 | 83135 | $5.6249975 \times 10^8$ | $1.48 \times 10^{-4}$ |
| 2000 | 111894 | $1.333333 \times 10^9$ | $8.39 \times 10^{-5}$ |

FIG. 7 illustrates the number of realistic combinations of two or three base stations ($N_{R-tot}$) as a function of the number of base stations (n) in the RNS. FIG. 8 illustrates the number of possible ($N_T$) and the number of realistic ($N_{R-tot}$) combinations of two or three base stations as a function of the number of base stations (n) in the RNS. Including the two curves in the same diagram clearly illustrates the significant difference. The curve representing the number of possible combinations grows very steeply, whereas the curve representing the number of realistic combinations remains at reasonable numbers close to the X-axis even for great numbers of base stations.

Looking at Table 3 the size of a DHO node selection database is not discouraging even for a large RNS. As an example, an RNS with 1000 base stations, which is almost twice as many as in the applicant's largest RNC configuration today (which is 540 base stations), the number of entries in the DHO node selection database would be around 54500, provided that only realistic base station combinations are included in the database. A reasonable average size of a database entry may be around 200 bytes if IPv6 addresses are used and around 50 bytes if IPv4 addresses are used. Hence, the memory needed for the DHO node selection database in an RNC controlling 1000 base stations would only be around 11 MB in an IPv6 RNS and around 2.6 MB in an IPv4 RNS. For a RNS with 100 base stations, the corresponding numbers would be as small as ~880 kB and ~220 kB respectively.

With small DHO node databases the recalculation times can also be kept within reasonable limits, even if rather small computation resources are allocated to the database recalculation. Even when assuming a rather conservative recalculation rate, e.g. one database entry per second, the entire database in a large RNS of 1500 base stations can be recalculated within 24 hours, which may be quite adequate for an optimizing feature like selection of distributed DHO nodes, which is not critical for the operation of the network and which is based on semi-static data.

Table 4 shows the relation between the size of the RNS and the time required to recalculate the entire DHO node selection database. However, the average convergence time after a change affecting the DHO node selection database is smaller than the time required to recalculate the entire database, since normally only a small fraction of the database entries are affected by the change.

TABLE 4

This table provides examples illustrating the relation between the RNS size and the time required to recalculate the entire DHO node selection database for three different recalculation rates, assuming that only realistic base station combinations are included in the database.

| Number of base stations, n | Number of database entries, $N_{R-tot}$ | Database recalculation times for different recalculation rates | | |
|---|---|---|---|---|
| | | Recalculation rate: 1 entry/second | Recalculation rate: 3 entries/second | Recalculation rate: 10 entries/second |
| 100 | 4419 | 1 hour, 14 min | 25 minutes | 7.4 minutes |
| 250 | 12439 | 3 hours, 27 min | 1 hour, 9 min | 20.7 minutes |
| 500 | 26280 | 7 hours, 18 min | 2 hours, 26 min | 43.8 minutes |
| 1000 | 54544 | 15 hours, 9 min | 5 hours, 3 min | 1 hour, 31 min |
| 1500 | 83135 | 23 hours, 6 min | 7 hours, 42 min | 2 hours, 19 min |
| 2000 | 111894 | 31 hours, 5 min | 10 hours, 22 min | 3 hours, 6 min |

The above discussion shows that a DHO node selection database can be restricted to a rather easily manageable size even for a large RNS. Moreover, even when considering only the realistic base station combinations, not all combinations will be equally frequently used. Some combinations are more likely, and some are quite unlikely, to appear in macro diversity configurations.

Another circumstance to keep in mind is that the information in the DHO node selection database has a semi-static nature. Changes that affect the DHO node selection database happen quite rarely. These circumstances can be utilized to design schemes that reduce the size of the database and/or optimize the recalculation of the database. Thereby the required memory can be reduced and the convergence time after changes that affect the DHO node selection database (e.g. topology changes, link upgrades affecting the generic cost metric of the link, base station upgrades from non-DHO capable to DHO capable, etc.) can be greatly improved for the realistic base station combinations, especially for those most frequently used.

Excluding unrealistic and irrelevant base station combinations from the database is an optimization that obviously saves memory. As a by-product it also reduces the time required to recalculate the database and thus reduces the convergence time. Another way to reduce the convergence time (except allocating more processing resources to the database recalculation) is to improve the recalculation method, e.g. by more intelligently selecting the database entries to be recalculated than simply going through all the database entries in a repetitive cycle. Through smart optimizations the resources consumed by the non-real-time DHO node selection scheme, in terms of memory and processing, can be reduced to rather insignificant numbers. According to one embodiment, the number of base station combinations in the database is limited based on the usefulness of the base station combinations.

Embodiment 1

The aim of the first embodiment is to reduce the size of the database. In this embodiment, the determination of the usefulness of a base station combination is based on neighbor relations of the base stations within the base station combination. Thus, the inclusion of base station combinations is performed selectively based on the cell neighbor lists in order to reduce the size of the database. That implies that base station combinations for which the base stations can be linked together via base station neighbor relations are included in the database.

As mentioned above, the geographical closeness that is needed for two cells to be part of the same soft handover configuration, i.e. to be part of the active set, is formalized in the configured cell neighbor lists. That is, each cell has a cell neighbor list associated with it, which specifies the cells in its vicinity (including both cells belonging to the same site, i.e. the same base station, and cells belonging to neighboring base stations) that are considered to be its neighbors in a soft handover context. You could see a neighbor relation defined in a cell neighbor list as a logical unidirectional "cell neighbor link" between the cell and the neighbor cell. A new cell can be added to the active set, i.e. added to the cells taking part in a soft handover configuration, only if there is a cell neighbor link to the new cell from one of the cells that are already a part of the active set. As a consequence, all the cells in a soft handover configuration can always be linked together in an unbroken chain of cell neighbor links. No cell can be isolated (in terms of cell neighbor links) from the others and neither can there, in a soft handover configuration, be groups of cells that are isolated from each other (in terms of cell neighbor links).

Zooming out from the cell perspective to a site (base station) perspective the term "base station neighbor link" can be defined. A base station neighbor link is different from a cell neighbor link, because each base station may serve up to three cells in each frequency band (but in UTRAN a soft handover configuration can only use cells from the same frequency band). For the purpose of simplifying explanations in this document a base station neighbor link between base station 1 and base station 2 is defined as existing if at least one of the cells belonging to base station 1 has a cell neighbor link to at least one of the cells belonging to base station 2 (or with other words that at least one of the cells belonging to base station 2 is included in the cell neighbor list of at least one of the cells belonging to base station 1) or at least one of the cells belonging to base station 2 has a cell neighbor link to at least one of the cells belonging to base station 1.

The cell neighbor lists in the RNC, and the base station neighbor links that can be derived from them, can be used to determine which base station combinations that are realistic. In this embodiment only combinations for which the base stations can be linked together via base station neighbor links (i.e. via cell neighbor relations) are included in the DHO node selection database.

Base station neighbor links have, however, a somewhat dynamic nature, since cells and base stations may be added and removed in the radio network and cell neighbor lists may be changed. Hence, determining the base station combinations to be included in the DHO node selection database is not a one-time event. On the contrary, there must be mechanisms that ensure that the contents of the DHO node selection database always reflect the current configuration of the radio network.

One way to cope with the dynamic nature of the radio network configuration is to trigger a "re-evaluation procedure" every time a new cell or a new base station is added or removed or a cell neighbor list is changed. The re-evaluation procedure would, starting from scratch, identify, based on base station neighbor links derived from the cell neighbor lists, the base station combinations to be included in the DHO node selection database. It would delete the ones that no longer belong in the database, if any, and include possible new ones.

A smarter and more efficient re-evaluation procedure could use the new, removed or changed neighbor list(s) as its basis and use this information to identify the existing realistic base station combinations (i.e. base station combinations that are included in the database) that are potentially affected and the new ones that can be formed, instead of starting the procedure from scratch.

Alternatively, instead of being triggered by radio network reconfiguration events a re-evaluation procedure may be continuously running in the background, constantly modifying (when mismatches are found) the set of base station combinations in the DHO node selection database.

Embodiment 2

The aim of the second embodiment is to reduce the size of the database similar to the first embodiment. According to the second embodiment, the determination of the usefulness of a base station combination is based on previous actual use of the base station combination.

In this embodiment the DHO node selection database is empty when the system is taken into use, to be gradually filled with entries based on actual usage data. Thus, a base station combination is not included in the database, until it is used in a macro diversity configuration, i.e. when it has proven its usefulness.

The first time a base station combination is used it is included in the database and its corresponding DHO node selection result is calculated. However, since this is a non-real-time DHO node selection mechanism, whose purpose is to relax the real-time requirements on the DHO node selection algorithm, the DHO node selection result is not calculated fast enough to satisfy the real-time requirements of connection establishment and macro diversity configuration changes. Hence, the DHO functionality is handled in the traditional way, i.e. only in the RNC, the first time a certain base station combination is used. (It would of course be possible to execute the DHO node selection algorithm in real-time the first time a certain base station combination is used, but this is not recommended.)

Subsequently, the next time the same base station combination is used in a macro diversity configuration, the DHO node selection result can be retrieved from the database.

This mechanism also requires that the usage of the existing database entries are monitored, so that entries that are no longer useful can be deleted. After e.g. topology changes or changes in the cell neighbor lists, a certain base station combination may become totally unrealistic (or even impossible e.g. if one of the included base stations has been removed). To remove such useless entries from the database the RNC may maintain a timestamp in each entry, e.g. denoted $T_{last-usage}$, indicating the last time the database entry was used. If the time since a certain entry was used exceeds a certain threshold, e.g. denoted $T_{threshold}$ (i.e. if $T_{current}-T_{last-usage}>T_{threshold}$), then the RNC deletes the entry from the database. This "pruning procedure" may be integrated with the recalculation of the database, such that the condition $T_{current}-T_{last-usage} \leq T_{threshold}$ (where $T_{current}$ denotes the current time) is checked prior to recalculating each database entry.

The timing out of unused database entries may also be based on the frequency with which each entry is used. A suitable measure of this usage frequency could be an exponential average of the time period between two consecutive times that an entry is used. If this exponential average exceeds a certain threshold value, the entry is deleted. In conjunction with embodiment 3, it is described how such an exponential average can be calculated.

Embodiment 3

Embodiments 3-6 provide optimizations of the recalculation of the database entries, aiming to improve convergence times and reduce the processing requirements.

A way to improve the average convergence time after changes that affect the DHO node selection database is to optimize the recalculation of the database entries such that more frequently used entries are recalculated more often than others by using a non-Uniform Use-Based Database Recalculation scheme according to embodiment 3. To achieve this the RNC should keep track of how often the entries are used, i.e. how often the corresponding base station combinations are used in macro diversity configurations.

Every time a certain base station combination is used in a macro diversity configuration the RNC records the current time in a timestamp, $T_{last-usage}$ (indicating the last time the entry was used), in the database entry for that combination. This $T_{last-usage}$ timestamp may be the same as the one described in conjunction with embodiment 2.

An exponential average of the time period between two consecutive occasions when the entry is used, $P_A$, is also calculated and stored in the database entry. That is the RNC calculates $P_{A-new}=\phi \times P_{A-old}+(1-\phi) \times (T_{current}-T_{last-usage})$ and stores $P_{A-new}$ as the new usage period average and $T_{current}$ (the current time) as the new timestamp (i.e. as the new $T_{last-usage}$) In this exponential average formula $P_{A-old}$ and $T_{last-usage}$ are the $P_A$ value and the timestamp that were previously stored in the database entry. $\phi$ is a constant that satisfies $0<\phi<1$ and which governs how fast the influence of old values on the exponential average decreases. The extreme (trivial) cases $\phi=0$ and $\phi=1$ are of little interest. For $\phi=1$ $P_A$ becomes a constant, which means that a recalculation scheme that depends on $P_A$ will not have the desired non-uniform properties. For $\phi=0$ $P_A$ will always be equal to the time period between the two last times the concerned Node B combination was used. $P_A$, and consequently a depending recalculation scheme, would then potentially vary quite widely. Over time the recalculation scheme could still have reasonable properties, but a more smoothly varying $P_A$ is likely to give the depending recalculation scheme more desirable properties. However, one advantage of setting $\phi=0$ is that it simplifies the calculations and may still give the non-uniform recalculation scheme at least acceptable properties. A suggested value of $\phi$ is $\phi=0.8$.

The RNC should also ensure that the value of $P_A$ does not become too large for an entry, because that could result in an unnecessarily and unacceptably long convergence time for that entry, if a change that affects the entry occurs. Therefore, if the calculation of $P_{A-new}$ results in a value exceeding a maximum allowed value, $P_{A-max}$, then the RNC should set $P_{A-new}=P_{A-max}$.

That is, the complete calculations that the RNC performs every time a database entry is used are:

$$P_{A-new}=\phi \times P_{A-old}+(1-\phi) \times (T_{current}-T_{last-usage})$$

$$\text{IF } P_{A-new}>P_{A-max} \text{ THEN } P_{A-new}=P_{A-max}$$

$$T_{last-usage}=T_{current}$$

$P_{A-new}$ and $T_{last-usage}$ are then stored in the database entry. $P_A$ should preferably be initiated to a rather high value, e.g. $P_{A-init}=P_{A-max}/2$. $T_{last-usage}$ is initiated to the time when the database entry was created (or the time when the RNC is taken into service).

Furthermore, every time the RNC recalculates the DHO node selection of a database entry it should record the current time in a second timestamp, $T_{last-recalculation}$, in the recalculated entry. $T_{last-recalculation}$ is initiated to the time when the database entry was created (or the time when the RNC is taken into service).

As the RNC repeatedly goes through the database to recalculate its entries, it recalculates the DHO node selection only for those entries for which the condition $T_{current}-T_{last-recalculation}>K \times P_A$ (where $T_{current}$ is the current time) is fulfilled. K is a configured constant that probably should be rather large, e.g. K>>1. What a reasonable value for K is depends on what typical values of $P_A$ that can be expected, how often changes that affect the DHO node selection can be expected to occur and, to a certain extent, how much of the RNC's computation resources an operator is willing to use for DHO node selection database recalculation. Lacking such statistics a rather arbitrary suggestion would be to choose K within the range $5 \leq K \leq 50$. The value of K could be fine-tuned based on statistics. A too small value of K could result in that too many of the database entries are recalculated every time the RNC goes through the database, thus resulting in less than intended differentiation of the recalculation frequencies for different entries. On the other hand, a too large value of K could result in that the RNC repeatedly goes through the entire database without recalculating a single entry, which could be seen as a waste of computation resources.

With this scheme the usage frequency of a database entry governs how often the entry is recalculated, thereby focusing the recalculation resources where they are needed the most.

In a variation of the non-uniform recalculation scheme the condition for recalculating an entry is replaced by a more rudimentary classification of the entries into three classes, based on their respective current $P_A$ value. The three classes are:

class 1: $P_A \leq P_{A-class-1-max}$
class 2: $P_{A-class-1-max} < P_A \leq P_{A-class-2-max}$
class 3: $P_A > P_{A-class-2-max}$ The RNC then recalculates the database entries based on these classes as follows ("Recalculation round" refers to the process of once going through all the entries in the database, checking the recalculation condition for each entry and recalculating the entries for which the condition is fulfilled):

| | |
|---|---|
| First recalculation round: | recalculate class 1 and class 2 entries |
| Second recalculation round: | recalculate class 1 and class 3 entries |
| Third recalculation round: | recalculate class 1 and class 2 entries |

Repeat the three rounds in a repetitive cycle.
or:

| | |
|---|---|
| First recalculation round: | recalculate all entries |
| Second recalculation round: | recalculate class 1 and class 2 entries |
| Third recalculation round: | recalculate class 1 entries |

Repeat the three rounds in a repetitive cycle.

With this variation using a condition for recalculation based on classes the RNC does not have to store the $T_{last-recalculation}$ timestamp in the database entries.

Variations with two, four or more entry classes are also conceivable.

If the dynamic use-based selective inclusion of base station combinations according to the second embodiment is used, $P_A$ may also be used to monitor the usage frequency database entries for the purpose of timing out unused or very rarely used entries. If $P_A$ exceeds a threshold value denoted $P_{A-timeout}$ (i.e. if $P_A > P_{A-timeout}$), then the entry is deleted from the database.

$P_{A-timeout}$ should be set to a large value, e.g. $P_{A-timeout} = 100 \times P_{A-max}$. If $P_A$ is used in this way as a basis for timing out useless database entries and if $P_{A-timeout} \geq P_{A-max}$, then the timeout mechanism will not work, if $P_A$, as described above, is not allowed to exceed $P_{A-max}$. Therefore, in case $P_A$ is used in the timeout mechanism, the actual $P_A$ value must be maintained and instead the smallest of $P_A$ and $P_{A-max}$ should be used when checking the recalculation condition. That is, the calculations that the RNC performs every time a database entry is used become:

$$P_{A-new} = \phi \times P_{A-old} + (1-\phi) \times (T_{current} - T_{last-usage})$$

$$T_{last-usage} = T_{current}$$

$P_{A-new}$ and $T_{last-usage}$ are then stored in the database entry.

And the condition for recalculating a database entry becomes:

$$T_{current} - T_{last-recalculation} > K \times MIN(P_A, P_{A-max})$$

Embodiment 4

One way to save time during the database recalculation process is to interrupt the recalculation of en entry, if it can be determined that the recalculation is redundant and that the result of the recalculation will not change the contents of the entry.

If the route tree for a certain base station combination (i.e. the tree of routes formed by the route from the RNC to each of the involved base stations) is the same, including both topology and link metrics, as the last time the entry was calculated, there is no need to perform the recalculation (since the result will inevitably be the same as the one that is already stored in the entry). But how does the RNC detect that the route tree is unchanged?

One way is to store the entire route tree in the DHO node selection database entry and compare it with the new one derived from fresh information from the topology database before performing the rest of the calculation.

Another way is to store a "signature" or a "digest" of the route tree (instead of the entire route tree) in the DHO node selection database entry, e.g. in the shape of a hash or a CRC calculation. This requires less memory than storing the entire route tree. However, a weakness of this method is that there is a (small but non-zero) risk that the digest of an updated route tree becomes the same as the digest of the route tree before the update, even though the two route trees are not equal. In such case the corresponding entry in the DHO node selection database would incorrectly be left unchanged, until the route tree of the concerned base station combination is once again updated.

A third way is to associate and store a timestamp with each route in the topology database. The timestamp would indicate the last time the route was updated. The RNC could use these timestamps in two different ways. It could compare them with a recalculation timestamp in the DHO node selection database entry, e.g. the same recalculation timestamp that was described in conjunction with the non-uniform use-based database recalculation scheme of the third embodiment, denoted $T_{last-recalculation}$ indicating the last time the entry was recalculated. If, when recalculation of an entry is considered, none of the timestamps of the concerned routes in the topology database indicates a time that is later than the recalculation timestamp in the DHO node selection database, then the recalculation need not be performed. Hence the condition for concluding the recalculation of a DHO node selection database entry becomes that $T_{route} > T_{last-recalculation}$ (where $T_{route}$ denotes the timestamp associated with a route in the topology database) is true for at least one of the concerned routes.

There is however a small risk that a route is updated after the route has been retrieved from the topology database, but before the $T_{last-recalculation}$ timestamp is written in the DHO node selection database entry. If this happens, the timestamp of the route, $T_{route}$, will indicate an earlier time than $T_{last-recalculation}$ which means that the next time (and following times) recalculation is considered for the concerned DHO node selection database entry, the entry will incorrectly be left unchanged (unless one of the concerned routes has been further updated in the meantime). To avoid this risk the timestamp condition could include a safety margin, such that the condition for concluding the recalculation of an entry becomes that $T_{route} > T_{last-recalculation} - S$ (where S is a time period that exceeds the maximum possible/reasonable time between retrieval of a route from the topology database and recording of the $T_{last-recalculation}$ timestamp in the DHO node selection database entry) is true for at least one of the concerned routes.

The other way to use the timestamps in the topology database is to store in each entry in the DHO node selection database the timestamps of all routes that were used in the calculation of the entry. If all these timestamps are the same when recalculation of the entry is considered, the recalculation need not be performed. In this case the timestamps could also be replaced by sequence numbers (incremented every time a route is updated) or a digest associated with each route in the topology database.

If recalculation timestamps are used in the DHO node selection database, for whatever purpose, they should be updated even when the recalculation of the entry is interrupted.

The topology database timestamps referred to in this section, $T_{route}$ may be the same as the ones described in conjunction with embodiment 8 described below (denoted $T_{last-relevant-event}$) and just as those timestamps they may also be stored in a list that is separate from the topology database.

Embodiment 5

A more or less ideal way to maintain the DHO node selection database is to trigger updates of each base station combination (i.e. database entry) only when needed, i.e. only when a change of the network configuration has occurred that affects the result of the DHO node selection calculation of that base station combination. A way to come close to this ideal is to have a tighter coupling between the maintenance of the topology database and the maintenance of the DHO node selection database, such that changes in the topology database triggers updating of potentially affected entries (also referred to as base station combinations) in the DHO node selection database.

When a change occurs in the topology database that potentially affects the DHO node selection calculations in the DHO node selection database, the RNC identifies and recalculates the entries in the DHO node selection database that include the concerned base stations. Such changes include:
  Changes in the route to a base station (including both changes in the path and changes in the link metrics).
  Changes in the DHO capability status of a node in the route to a base station or in the base station itself.
Other changes that affect the DHO node selection database include:
  Removal of a base station from the RNS.
  Deployment of a new base station in the RNS.
  Changes in the cell neighbor lists. (That is however only relevant if the inclusion of base station combinations in the DHO node selection database is based on neighbor relations.)
These other changes do not require recalculations of existing DHO node selection database entries. Instead they trigger deletion of old and/or creation of new entries in the DHO node selection database.

This "reactive" recalculation of DHO node selection database entries is close to the ideal in the sense that updates are triggered by actual changes and the entries to be updated are selected based on actual changes in the topology database. If nothing is changed in the topology database, no resources are wasted on redundant recalculations in the DHO node selection database. However, the method will still cause redundant recalculations, because the selection of affected entries is not perfect. Even if an entry in the DHO node selection database includes a base station, whose route has been updated in the topology database, the recalculation of the DHO node selection result in the entry may still arrive at the same (i.e. unchanged) result.

A limitation of this reactive recalculation method is, however, that it only works together with DHO node selection algorithms that consider only potential DHO nodes that are part of the route tree formed by the routes to the involved base stations, i.e. so called "on-tree" DHO nodes (see WO2005/62654). Otherwise it will not be possible to identify the affected entries in the DHO node selection database without performing the actual DHO node selection calculation for each entry.

Another limitation is that the reactive recalculation method may not be very efficient, if the delay metrics in the topology database are based on continuously repeated delay measurements (e.g. using the traceroute mechanism described in WO2005/62654), which cause small, but frequent, changes in the topology database. To reduce the number and frequency of insignificant measurement-based delay metric changes in the topology database the delay metrics could have a rather coarse granularity and could be based on rather extensive smoothing (e.g. using exponential averaging) of the measurement values. Without such countermeasures these changes may trigger frequent recalculations, which to the most part will be redundant, because the triggering delay metric change is too small to have an impact on the final DHO node selection calculation result. However, this property of the delay metric changes can be utilized to evade most of the impact of this limitation.

Given that the change that has triggered recalculations is a link delay metric change in the topology database it is possible to immediately sort out those of the affected entries in the DHO node selection database, whose DHO node selection result obviously will not be affected by the change, by including a "delay metric sensitivity threshold" in the database entry. The delay metric sensitivity threshold is calculated during the DHO node selection calculation and indicates the least change in link delay metrics (positive or negative) that may affect the outcome of the DHO node selection calculation. More advanced schemes, e.g. with different delay metric sensitivity thresholds for different routes or specific links, are also conceivable. However, such advanced schemes require more analysis, calculation and storage, which are obvious disadvantages. The scheme presented herein is seen as a reasonable compromise.

For example, when the DHO node selection algorithms described in WO2005162654 are used, the delay metric sensitivity threshold may indicate the smallest delay metric change that would impact the comparison between the transport delay of the macro diversity legs and the maximum allowed transport delay between a base station and the RNC. This impact could be in both directions. If the delay metric is increased, it may cause the transport delay of one of the macro diversity legs in the selected DHO node tree to exceed the maximum allowed transport delay. If the delay metric is decreased, it may cause the transport delay of a macro diversity leg in a discarded (because of too large transport delay) DHO node tree to go below the maximum allowed transport delay.

Thus, when a link delay metric is changed in the topology database, the RNC should note the size of the change and use it when identifying the affected entries in the DHO node selection database. With this mechanism the condition for recalculating an entry due to changes in the topology database, i.e. that the route to one of the base stations in the entry has been updated, is complemented with the condition that if the triggering change is a delay metric change, the entry is recalculated only if the size of the change is greater than the delay metric sensitivity threshold stored in the entry. With this additional condition most of the small, insignificant delay metric changes will not cause any recalculations in the DHO node selection database.

However, even if a delay metric change is too small to trigger recalculation of an affected entry, it may impact the delay metric sensitivity threshold of the entry. Therefore the delay metric sensitivity threshold of the affected entry has to be recalculated. This may however prove counterproductive, because the only way to do this properly is to redo the entire DHO node selection calculation, the avoidance of which is the very purpose of the delay metric sensitivity threshold. Therefore a simplified method is used. Assuming the worst case the delay metric sensitivity threshold is simply reduced by the size of the triggering delay metric change. In most cases this reduction will be too great. In many cases the real change of the delay metric sensitivity threshold may even have been an increase. A refinement of the scheme, that at least ensures that the delay metric sensitivity threshold is not decreased when it should actually be increased, is to calculate and store two delay metric sensitivity thresholds in each entry: one that indicates the smallest delay metric increase and one that indicates the smallest delay metric decrease that may affect the DHO node selection calculation result. This makes the recalculation condition more fine-tuned (considering not only the size but also the sign of the delay metric change) as well as ensures that the delay metric sensitivity thresholds can be adjusted in the right direction.

Depending on how the link delay metrics are measured the link delay metric changes may be detected one by one or several together in one measurement. If for instance the traceroute mechanism described in WO2005/62654 is used to measure the link delays, the link delays of all hops in the path between the RNC and a base station will be measured during the same measurement. If the change that triggers possible recalculations in the DHO node selection database involves several link delay metric updates, then the all the updates affecting any of the routes to the base stations included in an entry should be taken into account when considering recalculation of the entry. The size of the delay metric update, $D_{update-size}$, that should be used in the recalculation condition will thus be different for different database entries (depending on how many of the link delay metric updates that affect routes to the base stations that are included in the entry) and should be calculated as follows:

$$D_{update-size} = \text{MAX}\left(\sum_{i=1}^{k} D_i^+, \sum_{i=1}^{l} |D_i^-|\right),$$

where $D^+$ indicates a delay increase, $D^-$ indicates a delay decrease, k is the number of delay metric increases affecting the routes to the base stations of the entry and l is the number of delay metric decreases that affects the routes to the base stations of the concerned entry.

If dual delay metric sensitivity thresholds are used, one for delay increases and one for delay decreases, then both sums in the above calculation (instead of just the greatest one) should be used as the sizes of the delay metric increase and decrease respectively.

It may be useful to complement the reactive recalculation scheme with a mechanism that ensures that if the reactive recalculation scheme for some reason fails to recalculate an entry that should have been updated, e.g. due to programming errors or temporary malfunctioning, then this entry is not left with an erroneous DHO node selection result indefinitely. Such a complementing mechanism could be a slowly repetitive recalculation scheme running in the background. The repetitive recalculation scheme could be a non-uniform use-based recalculation scheme, as described in conjunction with the third embodiment, or a simple cyclic recalculation of all database entries.

Embodiment 6

An efficient way to reduce the convergence times is to temporarily allocate more computation resources to the database recalculation whenever a change occurs that can be assumed to have affected the DHO node selection database. Such changes are exemplified in embodiment 5. This mechanism should preferably be automatic and triggered by all relevant changes, but it could also be manual and used after certain selected major changes.

It would be beneficial to combine this optimization with reactive recalculation triggered by changes, as described in conjunction with embodiment 5.

Embodiment 7

Embodiments 7-9 provide optimizations aiming to avoid usage of outdated database entries.

Using a database entry that is affected by a recent change, but has not yet been updated may have undesirable consequences. It may result in suboptimal DHO node selection, which in turn may result in suboptimal (and even unacceptable) performance in terms of transmission delays and usage of transmission resources.

Even though such outdated database entries are present only during limited transient periods after the rather non-frequent changes that affect the DHO node selection database, it may be desirable to provide mechanisms to avoid using outdated database entries.

One such mechanism is based on timestamps. The RNC records the time of the last event that may potentially affect the DHO node selection database in a timestamp, e.g. denoted $T_{last-relevant-event}$. In addition the RNC maintains a timestamp in each entry in the DHO node selection database, indicating the last time the entry was recalculated, e.g. denoted $T_{last-recalculation}$ (e.g. the same recalculation timestamp that was described in conjunction with the non-uniform use-based database recalculation scheme according to embodiment 3 and/or the one described in conjunction with the interrupting redundant recalculations scheme according to embodiment 4). When looking up DHO node selection information in the DHO node database, the RNC would compare $T_{last-recalculation}$ of the relevant entry with $T_{last-relevant-event}$ and decide to use the information in the entry only if $T_{last-recalculation} > T_{last-relevant-event}$. Just as in the mechanism for interrupting redundant recalculations described for embodiment 4, a safety margin can be introduced in the condition such that the condition for using the information in the entry instead becomes that $T_{last-recalculation} - S > T_{last-relevant-event}$.

Embodiment 8

The above described method (embodiment 7) of using timestamps to avoid using outdated database entries can in accordance with embodiment 8 be enhanced by replacing the overall "event timestamp", i.e. $T_{last-relevant-event}$ with multiple timestamps, one for each base station in the RNS. This enhancement will, however, only work together with DHO node selection algorithms that consider only potential DHO nodes that are part of the route tree formed by the routes to the involved base stations, i.e. so called "on-tree" DHO nodes (see WO2005/62654).

In this embodiment the RNC maintains a list of all the base stations in the RNS, e.g. denoted "base station event list". Associated with each base station in the list is a timestamp indicating when the last event occurred that may affect entries in the DHO node selection database that include the base station. Such events may include:

Changes in the route to a base station (including both changes in which nodes that are traversed and changes in the link metrics).

Changes in the DHO capability status of a node in the route to a base station (or in the base station itself).

Removal of a base station from the RNS.

Deployment of a new base station in the RNS.

Other changes that may affect the DHO node selection results.

All the above events (except possibly the last "general" event) can, if you like, be seen as changes in the topology database (provided that the DHO capability status of each node is stored in the topology database). Thus, the timestamps could also be stored in the topology database, with one timestamp associated with each route (which corresponds to a base station), instead of in a separate list. The timestamps could be the same as the ones described in conjunction with the mechanism for interrupting redundant recalculations in accordance with embodiment 4 (denoted $T_{route}$).

As in the above described timestamp based method, a timestamp indicating the last time the entry was recalculated, $T_{last-recalculation}$ (e.g. the same recalculation timestamp as the one described in conjunction with embodiment 3 and/or embodiment 4) is stored in each entry in the DHO node selection database. However, in this enhanced method the condition for using the information in an entry in the DHO node selection database is that $T_{last-recalculation} > T_{last-relevant-event}$ is true for all the base stations that are included in the entry. That is, for each base station in the base station combination of the concerned database entry the associated event timestamp, $T_{last-relevant-event}$, has to be retrieved, from the base station event list or from the topology database, and compared with the recalculation timestamp, $T_{last-recalculation}$, of the concerned database entry. Just as in the mechanism for interrupting redundant recalculations described in conjunction with embodiment 4, a safety margin can be introduced in the condition such that the condition instead becomes that $T_{last-recalculation} - S > T_{last-relevant-event}$ is true for all the base stations that are included in the entry.

Embodiment 9

Another, brute but efficient, method to avoid usage of outdated database entries is to simply temporarily disable the macro diversity functionality means, and thus revert to using only RNCs as DHO nodes, after events that affect the content of the database comprising the base station combinations, until the database has been recalculated. This method may also be used selectively, e.g. only when certain major events occur that can be expected to have a large impact on the DHO node selection database.

To reduce the negative impact of this method it should preferably be combined with temporary allocation of additional computation resources for DHO node selection database recalculation, as described in conjunction with embodiment 6.

The nine described embodiments may be divided into three categories based on their aims. The first category comprises the first and second embodiments wherein the aim of the first and second embodiments is to reduce the size of the database. The second category comprises the third to the sixth embodiments wherein embodiments 3-6 provide optimizations of the recalculation of the database entries, aiming to improve convergence times and reduce the processing requirements. The third category comprises the seventh to ninth embodiments wherein embodiments 7-9 provide optimizations aiming to avoid usage of outdated database entries.

The three categories are independent of each other such that any optimization of the first category may be used in combination with any optimization of the second and third categories used separately or in combination. It is however preferred to use at least one optimization from each of the two first categories.

Embodiment 2 is the preferred embodiment. It is also preferred to use embodiment 2 in combination with one or two other optimizations defined by embodiments 3-8. Which these other optimizations are, depends on:

Whether the DHO node selection algorithm considers only potential "on-tree" DHO nodes (i.e. potential DHO nodes that are part of the route tree formed by the routes from the RNC to the involved base stations, see WO2005/62654. The expected frequency of changes in the topology database.

The first of these two "input parameters" can be formalized to a binary variable with the two possible values "on-tree DHO node selection algorithm" (or simply "on-tree algorithm") and "unconstrained DHO node selection algorithm" (or simply "unconstrained algorithm"). "On-tree algorithm" refers to a DHO node selection algorithm that selects DHO nodes only from the nodes that are part of the route tree formed by the routes from the RNC to the involved base stations. "Unconstrained algorithm" refers to a DHO node selection algorithm that is not constrained to select DHO nodes only from the nodes that are part of the route tree formed by the routes from the RNC to the involved base stations.

Similarly, the second "input parameter" may be simplified and formalized to a variable with the three possible values "low change frequency in the topology database" (or simply "low change frequency"), "medium change frequency in the topology database" (or simply "medium change frequency") and "high change frequency in the topology database" (or simply "high change frequency"). "Low change frequency" implies a change frequency that has no significant impact on the performance of any of the embodiments. "Medium change frequency" implies a change frequency that is rather high, but does not exceed a reasonable recalculation rate (i.e. it is not too high for the recalculation triggered by changes method of embodiment 5 to keep up with it). "High change frequency" implies a change frequency that exceeds a reasonable recalculation rate (i.e. it is too high for the recalculation triggered by changes method of embodiment 5 to keep up with it).

Six different combinations, or cases, can be formed of these two variables, resulting in potentially different recommendations on which embodiment(s) to use in combination with the dynamic use-based selective inclusion of base station combinations (embodiment 2) in the DHO node selection database.

For the two cases "on-tree algorithm" and "low change frequency" or "medium change frequency" it is recommended to use the reactive recalculation triggered by changes (embodiment 5) and probably also the timestamp and base station list based method to avoid using outdated database entries (embodiment 8). Optionally, temporary allocation of additional computation resources to database recalculation (embodiment 6) may also be used.

For the case "on-tree algorithm" and "high change frequency" it is recommended to use the non-uniform use-based database recalculation optimization (embodiment 3) and the timestamp and base station list based method to avoid using outdated database entries (embodiment 8).

For the case "unconstrained algorithm" and "low change frequency" it is recommended to use the non-uniform use-based database recalculation optimization (embodiment 3) and possibly the timestamp based method to avoid using outdated database entries (embodiment 6). Optionally, temporary allocation of additional computation resources to database recalculation (embodiment 6) may also be used.

For the case "unconstrained algorithm" and "medium change frequency" it is recommended to use the non-uniform use-based database recalculation optimization (embodiment 3). Optionally, temporary allocation of additional computation resources to database recalculation (embodiment 6) may also be used.

For the case "unconstrained algorithm" and "high change frequency" it is questionable whether this non-real-time DHO node selection scheme is useful at all.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An arrangement adapted to be located in a network node in a mobile communication network for selecting at least one diversity handover, DHO, node, that is to perform macro diversity functions, amongst the nodes of the mobile communication network comprising macro diversity functionality means, the selection is based on base station combinations of said mobile communication network and the arrangement comprises:
    means for retrieving at least one DHO node, that is to perform macro diversity functions, from a database comprising base station combinations of said mobile communication network and a pre-calculated DHO node selection for each such base station combination;
    means for updating the base station combinations to be included in the database;
    means for removing base station combinations from the database by time stamping each used base station combination such that the last time the combination was used is indicated; and
    means for removing a base station combination from the database based on an exponential average of time periods between two consecutive uses of said base station combination indicated by the time stampings.

2. The arrangement according to claim 1, wherein the nodes comprising macro diversity functionality means being base stations and nodes controlling base stations.

3. The arrangement according to claim 1, wherein the nodes comprising macro diversity functionality means being base stations.

4. The arrangement according to claim 1, comprising means for determining the usefulness of a base station combination based on neighbor relations of the base stations within the base station combination.

5. The arrangement according to claim 1, comprising means for including base station combinations for which the base stations can be linked together via base station neighbor relations in the database.

6. The arrangement according to claim 4, comprising means for determining the usefulness of a base station combination based on previous actual use of the base station combination.

7. The arrangement according to claim 1, comprising means for triggering updating of the base station combinations to be included in the database by a configuration change of the mobile communication network.

8. The arrangement according to claim 1, comprising means for performing continuous updating of the base station combinations to be included in the database as a background process.

9. The arrangement according to claim 1, comprising means for basing updates of the base station combinations to be included in the database on new base station neighbor relations.

10. The arrangement according to claim 1, comprising means for removing a base station combination from the database if the time since said base station combination was time stamped exceeds a pre-defined threshold.

11. The arrangement according to claim 1, comprising means for removing a base station combination from the database based on a frequency with which said base station combination has been used.

12. The arrangement according to claim 1, comprising means for updating the pre-calculated DHO node selections for the base station combinations stored in the database.

13. The arrangement according to claim 12, comprising means for performing continuous updating of the pre-calculated DHO node selections for the base station combinations in the database as a background process.

14. The arrangement according to claim 12, comprising means for triggering updating of the pre-calculated DHO node selections for the base station combinations in the database by a configuration change of the mobile communication network.

15. The arrangement according to claim 14, comprising means for temporarily allocating more computation resources to the updating when the configuration of the mobile communication network changes.

16. The arrangement according to claim 12, comprising means for interrupting updating of the pre-calculated DHO node selection of a base station combination in the database if it is determined that the updating will not change the DHO node selection of the base station combination.

17. The arrangement according to claim 16, comprising means for storing a tree of routes formed by the route from the network node to each of the base stations in the base station combination and means for comparing the stored tree of routes with a new tree of routes derived from information from an updated topology database.

18. The arrangement according to claim 17, comprising means for storing the tree of routes by means of a signature or digest.

19. The arrangement according to claim 16, wherein the means for interrupting comprises further means for updating of the pre-calculated DHO node selection for a base station combination in the database, if said new tree of routes is different from said stored tree of routes.

20. The arrangement according to claim 16, comprising means for storing a timestamp associated with the route from the network node to each base station, wherein the timestamp indicates the last time when the route was updated.

21. The arrangement according to claim 20, comprising means for storing a timestamp associated with each base station combination in the database, wherein the timestamp indicates the last time the DHO node selection for the base station combination was calculated.

22. The arrangement according to claim 21, comprising means for interrupting updating of the DHO node selection for a base station combination in the database if the timestamp associated with the base station combination indicates a later time than the timestamps associated with the routes from the network node to all the base stations in the base station combination.

23. The arrangement according to claim 12, comprising means for triggering updating of the DHO node selection for a base station combination in the database by a configuration change of the mobile communication network if it is determined that the updating will change the DHO node selection for the base station combination.

24. The arrangement according to claim 23, comprising means for temporarily allocating more computation resources to the updating if it is determined that the updating will change the DHO node selection of the base station combination in the database.

25. The arrangement according to claim 1, comprising means for storing a timestamp that indicates the time of the last relevant event in the mobile communication network, wherein the last relevant event is a type of events that may affect the DHO node selection of base station combinations in the database.

26. The arrangement according to claim 25, comprising means for storing a timestamp associated with each base station combination in the database, wherein the timestamp indicates the last time the DHO node selection for the base station combination was calculated.

27. The arrangement according to claim 26, comprising means for avoiding to use the DHO node selection of a base station combination in the database, unless the timestamp associated with the base station combination indicates a later time than said timestamp that indicates the time of the last relevant event in the mobile communication network.

28. The arrangement according to claim 1, comprising means for time stamping a base station wherein the timestamp indicates when the last event occurred that may affect the DHO node selection of base station combinations that include said base station in the database.

29. The arrangement according to claim 28, comprising means for storing a timestamp associated with each base station combination in the database, wherein the timestamp indicates the last time the DHO node selection for the base station combination was calculated.

30. The arrangement according to claim 29, comprising means for avoiding to use the DHO node selection of a base station combination in the database, unless the timestamp associated with the base station combination indicates a later time than the timestamps of all the base stations in said base station combination.

31. The arrangement according to claim 1, comprising means for temporarily disabling macro diversity functionality means after events that affect the content of the database of base station combinations.

32. The arrangement according to claim 1, wherein the network node is a Radio Network Controller.

33. The arrangement according to claim 1, wherein the mobile communication network is a Wideband Code Division Multiple Access (WCDMA) network or an evolved version thereof.

* * * * *

UNITED STATES PATENT AND TRADEMARK OFFICE
CERTIFICATE OF CORRECTION

PATENT NO.       : 8,095,084 B2
APPLICATION NO.  : 12/279612
DATED            : January 10, 2012
INVENTOR(S)      : Rune It is certified that error appears in the above-identified patent and that said Letters Patent is hereby corrected as shown below:

In the drawings:

In Fig. 6, Sheet 5 of 6, delete "1,20E+09" and insert -- 12,00E+09 --, therefor.

In Fig. 6, Sheet 5 of 6, delete "1,00E+09" and insert -- 1,000E+09 --, therefor.

In Column 2, Line 47, delete "WO2005162655" and insert -- WO2005/62655 --, therefor.

In Column 6, Line 38, delete "DESCRIPTION" and insert -- DETAILED DESCRIPTION --, therefor.

In Column 22, Line 18, delete "WO2005162654" and insert -- WO2005/62654 --, therefor.

In Column 24, Line 36, delete "$T_{\text{last-relevant-event}}$" and insert -- $T_{\text{last-relevant-event}}$, --, therefor.

Signed and Sealed this
Twenty-fourth Day of April, 2012

David J. Kappos
*Director of the United States Patent and Trademark Office*